(12) United States Patent　　(10) Patent No.:　US 12,665,250 B2
　Kato　　　　　　　　　　　　　(45) Date of Patent:　　Jun. 23, 2026

(54) POWER STORAGE

(71) Applicant: TOYOTA JIDOSHA KABUSHIKI KAISHA, Toyota (JP)

(72) Inventor: Masashi Kato, Konan (JP)

(73) Assignee: TOYOTA JIDOSHA KABUSHIKI KAISHA, Toyota (JP)

( * ) Notice:　Subject to any disclaimer, the term of this patent is extended or adjusted under 35 U.S.C. 154(b) by 731 days.

(21) Appl. No.: 17/706,824

(22) Filed:　Mar. 29, 2022

(65)　　　　Prior Publication Data

US 2022/0320664 A1　　Oct. 6, 2022

(30)　　Foreign Application Priority Data

Mar. 31, 2021　(JP) ................................. 2021-060844

(51) Int. Cl.
　H01M 50/242　　(2021.01)
　H01M 50/204　　(2021.01)
　H01M 50/249　　(2021.01)
(52) U.S. Cl.
　CPC ....... H01M 50/242 (2021.01); H01M 50/204 (2021.01); H01M 50/249 (2021.01)
(58) Field of Classification Search
　CPC .......................... H01M 50/204; H01M 50/249
　See application file for complete search history.

(56)　　　　References Cited

U.S. PATENT DOCUMENTS

2003/0054241 A1　3/2003　Yamashita et al.
2004/0070366 A1*　4/2004　Takeshita ............ H01M 50/507
　　　　　　　　　　　　　　　　　　320/107

2008/0124625 A1　5/2008　Hock et al.
2013/0149600 A1*　6/2013　Park ..................... H01M 50/119
　　　　　　　　　　　　　　　　　　　　　429/179
2013/0192058 A1　8/2013　Watanabe et al.
2015/0214570 A1　7/2015　Deponte et al.
2017/0012315 A1　1/2017　Kayano et al.
2017/0125786 A1　5/2017　Park et al.
2019/0027712 A1　1/2019　Wei et al.
　　　　　　　(Continued)

FOREIGN PATENT DOCUMENTS

CN　　105981197 A　　9/2016
CN　　111699566 A　　9/2020
　　　　　(Continued)

OTHER PUBLICATIONS

WO2020/262812 A1 Machine Translation (Year: 2020).*
JP 2012204038 A Machine Translation (Year: 2012).*

*Primary Examiner* — Mark Ruthkosky
*Assistant Examiner* — Sarah J Jacobson
(74) *Attorney, Agent, or Firm* — Sughrue Mion, PLLC

(57)　　　　ABSTRACT

A power storage includes a stack made of stacked power storage cells and a casing in which the stack is accommodated. The casing includes a pair of wall portions provided such that the stack lies therebetween in a direction of stack. Each of the pair of wall portions includes a central portion located in a center in a plane direction orthogonal to the direction of stack and an outer peripheral portion located around the central portion. Each of the pair of wall portions is in such a recessed shape that the central portion is closer to the stack than the outer peripheral portion. The stack is sandwiched between the central portions included in the pair of wall portions.

11 Claims, 2 Drawing Sheets

(56) References Cited

U.S. PATENT DOCUMENTS

| | | | |
|---|---|---|---|
| 2020/0350644 | A1 | 11/2020 | Cho et al. |
| 2020/0403194 | A1 | 12/2020 | Amano et al. |
| 2021/0257693 | A1* | 8/2021 | Lee .................... H01M 50/569 |
| 2021/0265685 | A1 | 8/2021 | Jeong et al. |

FOREIGN PATENT DOCUMENTS

| | | | | |
|---|---|---|---|---|
| CN | 112514144 | A | | 3/2021 |
| JP | 2003-257407 | A | | 9/2003 |
| JP | 2004-158434 | A | | 6/2004 |
| JP | 2012-119232 | A | | 6/2012 |
| JP | 2012204038 | A | * | 10/2012 |
| JP | 2013-164975 | A | | 8/2013 |
| JP | 2013-229266 | A | | 11/2013 |
| JP | 2014-093239 | A | | 5/2014 |
| KR | 10-2011-0000003 | A | | 1/2011 |
| KR | 10-2021-0000548 | A | | 1/2021 |
| WO | 2014/013198 | A1 | | 1/2014 |
| WO | 2014/026793 | A1 | | 2/2014 |
| WO | 2015/121926 | A1 | | 8/2015 |
| WO | WO-2020262812 | A1 | * | 12/2020 ........ H01M 10/0481 |

* cited by examiner

POWER STORAGE

This nonprovisional application is based on Japanese Patent Application No. 2021-060844 filed with the Japan Patent Office on Mar. 31, 2021, the entire contents of which are hereby incorporated by reference.

BACKGROUND

Field

The present disclosure relates to a power storage.

Description of the Background Art

Japanese Patent Laying-Open No. 2013-229266 discloses as a conventional power storage, a construction in which a stack made by stacking in a direction of stack, laminate-type power storage cells each having a rectangular shape in a top view is sandwiched between end plates in the direction of stack, the laminate-type power storage cell having a terminal protruding from each of a pair of opposing short sides.

SUMMARY

In the power storage disclosed in Japanese Patent Laying-Open No. 2013-229266, however, the stack is sandwiched between the pair of end plates from opposing sides in the direction of stack. Therefore, when each of the power storage cells expands, excessive force is applied to the stack.

When flexural rigidity is low, with application of vibration to the power storage, the entire power storage deforms as being bent, and it may resonate.

The present disclosure was made in view of problems as above, and an object of the present disclosure is to provide a power storage capable of achieving improvement in flexural rigidity while application of excessive force to a power storage cell is suppressed in expansion of the power storage cell.

A power storage based on the present disclosure includes a stack made of stacked power storage cells and a casing in which the stack is accommodated. The casing includes a pair of wall portions provided such that the stack lies between the pair of wall portions in a direction of stack. Each of the pair of wall portions includes a central portion located in a center in a plane direction orthogonal to the direction of stack and an outer peripheral portion located around the central portion. Each of the pair of wall portions is in such a recessed shape that the central portion is closer to the stack than the outer peripheral portion. The stack is sandwiched between the central portions included in the pair of wall portions.

According to the construction, each of the pair of wall portions is in such a recessed shape that the central portion thereof comes closer to the stack. Therefore, when the power storage cell expands, the central portion elastically deforms to accommodate expansion of the power storage cell. Stress applied by expansion of the power storage cell is thus relaxed and application of excessive force to the stack can be suppressed. Since each of the pair of wall portions is in such a recessed shape that the central portion thereof comes closer to the stack, higher flexural rigidity than in an example in which each of a pair of wall portions is in a shape of a flat plate can be achieved. Thus, even when vibration is transmitted to the power storage, deformation of the entire power storage as being bent is suppressed. Consequently, resonance of the power storage by vibration transmitted to the power storage can be suppressed.

In the power storage based on the present disclosure, each of the power storage cells includes an electrode assembly, an exterior film with which the electrode assembly is sealed, an electrolyte solution accommodated in the inside of the exterior film, and a current collection plate connected to the electrode assembly and provided to protrude from the exterior film. In this case, the power storage may further include an insulating cover portion that covers a part of the current collection plate that protrudes from the exterior film.

According to the construction, the cover portion that covers the part of the current collection plate that protrudes from the exterior film is provided. Therefore, even when the electrolyte solution leaks from the exterior film, short-circuiting between power storage cells can be suppressed.

In the power storage based on the present disclosure, the cover portion may include an adhesive that bonds the exterior film and the current collection plate with each other and a filling member with which the casing is partially filled. In this case, preferably, the filling member is provided to cover the adhesive and the part of the current collection plate that protrudes from the exterior film.

According to the construction, heat generated from the power storage cell can be transferred to the casing through the filling member and can be radiated to the outside of the casing.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
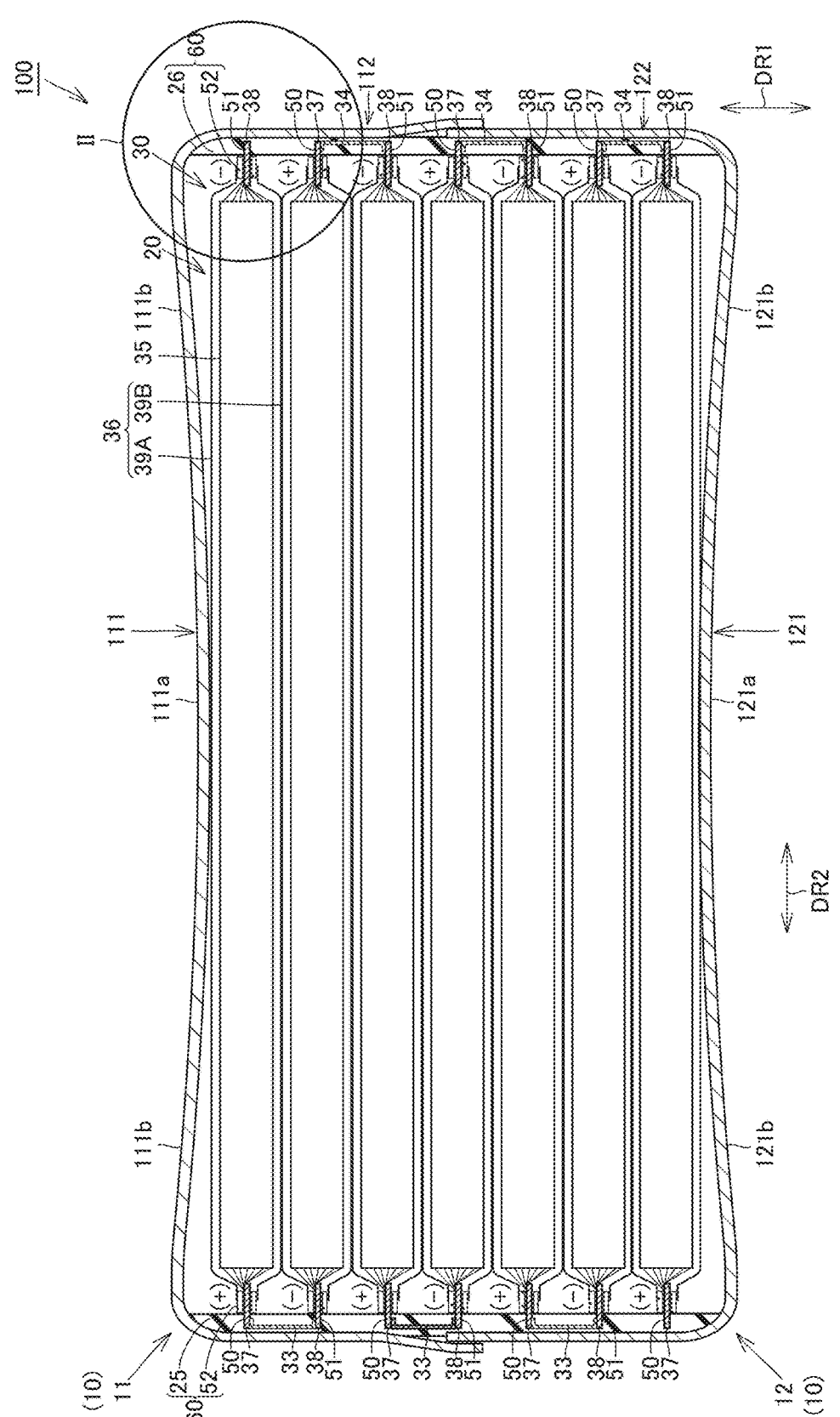
FIG. 1 is a schematic cross-sectional view showing a power storage according to an embodiment.

An embodiment of the present disclosure will be described in detail below with reference to the drawings. The same elements or elements in common in the embodiment shown below have the same reference characters allotted in the drawings and description thereof will not be repeated.

FIG. 1 is a schematic cross-sectional view showing a power storage according to an embodiment.

Figure 2:
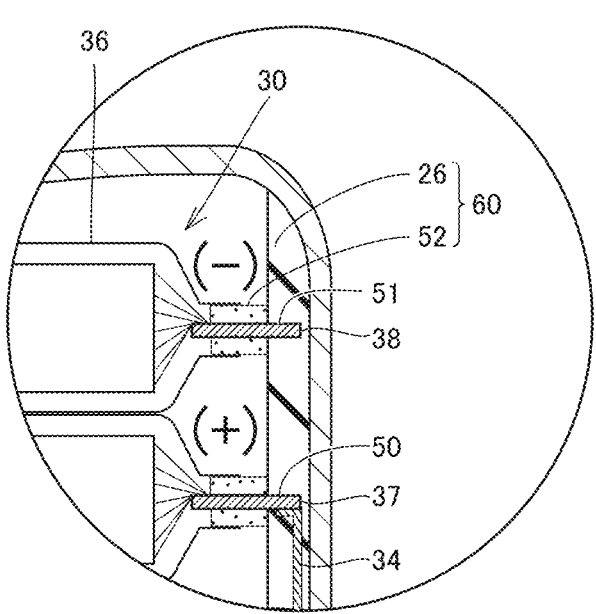
FIG. 2 is an enlarged view of the area surrounded by line II in FIG. 1.

FIG. 2 is an enlarged view of the area surrounded by line II in FIG. 1. A power storage 100 according to the embodiment will be described with reference to FIG. 1 and FIG. 2.

Power storage 100 is mounted on a vehicle. The vehicle is a hybrid vehicle that can travel with motive power from at least one of a motor and an engine or an electrically powered vehicle that travels with driving force obtained from electric energy.

As shown in FIG. 1, power storage 100 includes a casing 10, a power storage module 20, and a cover portion 60.

Power storage module 20 includes a stack made of stacked power storage cells 30 in a direction of stack DR1 and bus bars 33 and 34. Direction of stack DR1 is, for example, in parallel to a vertical direction.

Each of power storage cells 30 includes an electrode assembly 35, an exterior film 36, a positive electrode current collection plate 37, a negative electrode current collection plate 38, an electrolyte solution (not shown), and an adhesive 52.

Exterior film 36 is formed from an aluminum laminate film or the like. Electrode assembly 35 and a not-shown electrolyte solution are accommodated in the inside of exterior film 36. Exterior film 36 is in a rectangular shape in a plan view and includes a pair of long side portions and a pair of short side portions. The pair of long side portions extends along a longitudinal direction DR2. The pair of short side portions extends in a direction orthogonal to direction of stack DR1 and longitudinal direction DR2.

Exterior film 36 includes an upper film 39A and a lower film 39B. Upper film 39A is arranged to cover electrode assembly 35 from above and lower film 39B is provided to cover electrode assembly 35 from below.

An outer peripheral portion of upper film 39A and an outer peripheral portion of lower film 39B are bonded to each other by a not-shown adhesive.

Electrode assembly 35 is formed into a shape of a parallelepiped. Electrode assembly 35 includes positive electrode sheets, separators, and negative electrode sheets stacked in direction of stack DR1. The separator is arranged between the positive electrode sheet and the negative electrode sheet.

Positive electrode current collection plate 37 is formed of aluminum or the like. Positive electrode current collection plate 37 is arranged on one side or the other side in longitudinal direction DR2 and arranged to protrude from exterior film 36 in longitudinal direction DR2. In other words, positive electrode current collection plate 37 protrudes toward an outer side of exterior film 36 along longitudinal direction DR2 from any of the pair of short side portions of exterior film 36. Positive electrode sheets are welded to positive electrode current collection plate 37. Positive electrode current collection plate 37 is thus connected to electrode assembly 35.

Positive electrode current collection plate 37 is bonded to exterior film 36 by adhesive 52. Positive electrode current collection plate 37 protrudes outward relative to exterior film 36 and adhesive 52 in longitudinal direction DR2. Positive electrode current collection plate 37 includes an exposed portion 50 exposed through exterior film 36 and adhesive 52.

Negative electrode current collection plate 38 is formed of copper or the like. Negative electrode current collection plate 38 is arranged on a side opposite to a side where positive electrode current collection plate 37 is arranged in longitudinal direction DR2 and arranged to protrude from exterior film 36 in the longitudinal direction. In other words, negative electrode current collection plate 38 protrudes toward the outer side of exterior film 36 along longitudinal direction DR2 from a short side portion located opposite to the short side portion where positive electrode current collection plate 37 protrudes, of the pair of short side portions of exterior film 36. Negative electrode sheets are welded to negative electrode current collection plate 38. Negative electrode current collection plate 38 is thus connected to electrode assembly 35.

Adhesive 52 is provided on an upper surface and a lower surface of positive electrode current collection plate 37 at an edge of exterior film 36 where positive electrode current collection plate 37 protrudes. Adhesive 52 thus bonds an inner surface of upper film 39A and the upper surface of positive electrode current collection plate 37 with each other and bonds an inner surface of lower film 39B and the lower surface of positive electrode current collection plate 37 with each other. Adhesive 52 is provided to protrude toward the outer side of exterior film 36 along longitudinal direction DR2 from the edge of exterior film 36 where positive electrode current collection plate 37 protrudes.

Adhesive 52 is provided on an upper surface and a lower surface of negative electrode current collection plate 38 at an edge of exterior film 36 where negative electrode current collection plate 38 protrudes. Thus, adhesive 52 bonds the inner surface of upper film 39A and the upper surface of negative electrode current collection plate 38 with each other and bonds the inner surface of lower film 39B and the lower surface of negative electrode current collection plate 38 with each other. Adhesive 52 is provided to protrude toward the outer side of exterior film 36 along longitudinal direction DR2 from the edge of exterior film 36 where negative electrode current collection plate 38 protrudes.

Power storage cells 30 are arranged such that positive electrode current collection plate 37 and negative electrode current collection plate 38 are alternately aligned in direction of stack DR1.

Positive electrode current collection plate 37 and negative electrode current collection plate 38 are connected to each other through bus bar 33 on one side in longitudinal direction DR2. The lower surface of positive electrode current collection plate 37 at exposed portion 50 and the upper surface of negative electrode current collection plate 38 at exposed portion 51 are connected to each other through bus bar 33.

Bus bar 33 includes a pair of lateral wall portions in contact with the lower surface of positive electrode current collection plate 37 at exposed portion 50 and the upper surface of negative electrode current collection plate 38 at exposed portion 51 and a vertical wall portion that connects the lateral wall portions to each other. The vertical wall portion connects ends of the lateral wall portions located on one side in longitudinal direction DR2 to each other.

Positive electrode current collection plate 37 and negative electrode current collection plate 38 are connected to each other through bus bar 34 on the other side in longitudinal direction DR2. The lower surface of positive electrode current collection plate 37 at exposed portion 50 and the upper surface of negative electrode current collection plate 38 at exposed portion 51 are connected to each other through bus bar 34.

Bus bar 34 includes a pair of lateral wall portions in contact with the lower surface of positive electrode current collection plate 37 at exposed portion 50 and the upper surface of negative electrode current collection plate 38 at exposed portion 51 and a vertical wall portion that connects the lateral wall portions to each other. The vertical wall portion connects ends of the lateral wall portions located on the other side in longitudinal direction DR2 to each other.

Power storage cells 30 are thus connected in series through bus bars 33 and 34.

Cover portion 60 covers a part of the current collection plate that protrudes from exterior film 36. Specifically, for example, cover portion 60 is composed of adhesive 52 and insulating members 25 and 26 as filling members.

Insulating member 25 is provided in casing 10 on one side in longitudinal direction DR2. Insulating member 25 is filled to reach power storage module 20 from a sidewall of casing 10 located on one side in longitudinal direction DR2. Insulating member 25 is, for example, an insulating resin member. Insulating member 25 is thermally conductive to some extent.

Insulating member 25 covers exposed portion 50 of positive electrode current collection plate 37, exposed portion 51 of negative electrode current collection plate 38, and bus bar 33 on one side in longitudinal direction DR2. Thus, on one side in longitudinal direction DR2, respective parts of positive electrode current collection plate 37 and negative electrode current collection plate 38 that protrude from exterior films 36 are entirely covered with insulating member 25 and adhesive 52.

Insulating member 26 is provided in casing 10 on the other side in longitudinal direction DR2. Insulating member 26 is filled to reach power storage module 20 from a sidewall of casing 10 located on the other side in longitudinal direction DR2. Insulating member 26 is, for example, an insulating resin member. Insulating member 26 is thermally conductive to some extent.

Insulating member 26 covers exposed portion 50 of positive electrode current collection plate 37, exposed portion 51 of negative electrode current collection plate 38, and bus bar 34 on the other side in longitudinal direction DR2. Thus, on the other side in longitudinal direction DR2, respective parts of positive electrode current collection plate 37 and negative electrode current collection plate 38 that protrude from exterior films 36 are entirely covered with insulating member 26 and adhesive 52.

By thus providing cover portion 60, even when the electrolyte solution leaks from exterior film 36, short-circuiting between power storage cells 30 can be suppressed.

Exposed portions 50 and 51 and bus bars 33 and 34 are composed of a metal material. Therefore, when power storage module 20 generates heat due to charging and discharging, heat in power storage module 20 can conduct to insulating members 25 and 26. Since insulating members 25 and 26 are in contact with the sidewalls of casing 10 located on one side and the other side in longitudinal direction DR2, heat that conducts to insulating members 25 and 26 can be radiated from the sidewalls located on one side and the other side in longitudinal direction DR2.

Since the vertical wall portion of bus bar 33 connects to each other, the ends located on one side in longitudinal direction DR2 of ends of the lateral wall portions as above, heat can efficiently conduct from bus bar 33 to the sidewall located on one side in longitudinal direction DR2.

Similarly, since the vertical wall portion of bus bar 34 connects to each other, the ends located on the other side in longitudinal direction DR2 of ends of the lateral wall portions, heat can efficiently conduct from bus bar 34 to the sidewall located on the other side in longitudinal direction DR2.

A cooling apparatus that cools the sidewalls of casing 10 located on one side and the other side in longitudinal direction DR2 may be arranged on the outside of the sidewalls. In this case, power storage module 20 can more effectively be cooled.

Casing 10 includes an upper case 11 and a lower case 12 and power storage module 20 is accommodated therein.

Upper case 11 is substantially in a box shape that opens downward. Upper case 11 has an inner surface covered with an insulating member (not shown) such as an insulating resin. Upper case 11 includes an upper wall portion 111 and a peripheral wall portion 112. Peripheral wall portion 112 is provided to extend downward from a periphery of upper wall portion 111.

Upper wall portion 111 includes a central portion 111a and an outer peripheral portion 111b located around central portion 111a. Upper wall portion 111 is in such a recessed shape that central portion 111a is closer to power storage module 20. Central portion 111a is located closer to power storage module 20 than outer peripheral portion 111b such that power storage module 20 can lie between central portions. Outer peripheral portion 111b surrounds central portion 111a. Outer peripheral portion 111b is provided as being more distant from power storage module 20 toward the periphery of upper wall portion 111.

Lower case 12 is substantially in a box shape that opens upward. Lower case 12 has an inner surface covered with an insulating member (not shown) such as an insulating resin. Lower case 12 includes bottom wall portion 121 and a peripheral wall portion 122. Peripheral wall portion 122 is provided to extend upward from a periphery of bottom wall portion 121.

Bottom wall portion 121 includes a central portion 121a and an outer peripheral portion 121b located around central portion 121a. Bottom wall portion 121 is in such a recessed shape that central portion 121a is closer to power storage module 20. Central portion 121a is located closer to power storage module 20 than outer peripheral portion 121b such that power storage module 20 can lie between the central portions. Outer peripheral portion 121b surrounds central portion 121a. Outer peripheral portion 121b is provided as more distant from power storage module 20 toward the periphery of bottom wall portion 121.

Upper case 11 and lower case 12 are fixed with a tip end side of peripheral wall portion 122 of lower case 12 being pressed into the inside on a lower end side of peripheral wall portion 112 of upper case 11. A sealing member such as a gasket may be arranged between the tip end side of peripheral wall portion 122 of lower case 12 and the lower end side of peripheral wall portion 112 of upper case 11.

Power storage module 20 is sandwiched between central portion 111a of upper wall portion 111 and central portion 121a of bottom wall portion 121 in direction of stack DR1.

Upper wall portion 111 and bottom wall portion 121 are provided as being elastically deformable. When power storage cell 30 expands, upper wall portion 111 and bottom wall portion 121 deform to accommodate expansion of power storage cell 30. Application of excessive force to power storage module 20 in expansion of power storage cell 30 is thus suppressed and power storage module 20 can be restrained with moderate force.

Outer peripheral portion 111b is provided as being more distant from power storage module 20 toward the periphery of upper wall portion 111 and outer peripheral portion 121b is provided as being more distant from power storage module 20 toward the periphery of bottom wall portion 121, so that flexural rigidity can be higher than in an example where upper wall portion 111 and bottom wall portion 121 are each in a shape of a flat plate. Thus, even when vibration is transmitted to power storage 100, deformation of the entire power storage 100 as being convexly or concavely bent is suppressed. Consequently, resonance of power storage 100 by vibration transmitted to power storage 100 can be suppressed.

When central portion 111a and central portion 121a have a larger area, in the event of generation of gas in the inside of exterior film 36, this gas more readily moves toward an outer periphery of exterior film 36 and ease in gas escape can be improved. In other words, ease in gas escape between adjacent power storage cells 30 can be improved.

In an initial state, by increasing an amount of recess representing closeness of central portions 111a and 121a to the stack as compared with outer peripheral portions 111b and 121b, force with which the stack is sandwiched can be increased and resistance against vibration can further be enhanced. While the stack is sandwiched, by decreasing the amount of recess, outer peripheral portions 111b and 121b and central portions 111*a* and 121*a* are closer to a flat state, so that an interpolar distance between adjacent storage cells 30 or between adjacent stacks is readily maintained. Specifically, in a state before the stack is sandwiched between upper wall portion 111 and bottom wall portion 121 which form the pair of wall portions, an amount of recess of central portions 111*a* and 121*a* as compared with outer peripheral portions 111*b* and 121*b* may be smaller than an amount of recess in a state after the stack is sandwiched between upper wall portion 111 and bottom wall portion 121.

(Other Modifications)

An example in which the vertical wall portion of bus bar 33 connects the ends located on one side in longitudinal direction DR2, of the ends of the lateral wall portions and the vertical wall portion of bus bar 34 connects the ends located on one side in longitudinal direction DR2, of the ends of the lateral wall portions is illustrated and described in the embodiment above. Without being limited as such, the vertical wall portion of bus bar 33 may connect ends located on the other side in longitudinal direction DR2, of the ends of the lateral wall portions and the vertical wall portion of bus bar 34 may connect ends located on one side in longitudinal direction DR2, of the ends of the lateral wall portions. In this case, bus bars 33 and 34 and positive electrode current collection plate 37 and negative electrode current collection plate 38 can readily be welded to each other.

An example in which positive electrode current collection plate 37 and negative electrode current collection plate 38 protrude from the short side portion of exterior film 36 toward the outer side of exterior film 36 along longitudinal direction DR2 is illustrated and described in the embodiment above. Without being limited as such, positive electrode current collection plate 37 and negative electrode current collection plate 38 may protrude from the long side portion of exterior film 36 toward the outer side of exterior film 36 along the short-side direction. Though an example in which positive electrode current collection plate 37 and negative electrode current collection plate 38 protrude from different sides is illustrated and described, without being limited as such, they may protrude from an identical side.

An example in which cover portion 60 is formed from insulating members 25 and 26 and adhesive 52 is illustrated and described in the embodiment above. Without being limited as such, cover portion 60 may be formed from adhesive 52 without insulating members 25 and 26 being provided. In this case, adhesive 52 covers a whole part of the current collection plate that protrudes from exterior film 36.

Cover portion 60 may be formed from insulating member 25 or 26. In this case, adhesive 52 is provided not to protrude outward from exterior film 36 and insulating member 25 or 26 covers a whole part of the current collection plate that protrudes from exterior film 36.

An example in which a power storage cell included in power storage module 20 is a laminate-type battery in which an electrolyte solution and electrode assembly 35 are accommodated in the inside of an exterior film is illustrated and described in the embodiment above. Without being limited as such, a laminate-type solid-state battery in which an electrolyte solution is not accommodated in the inside of the exterior film but a solid electrolyte is employed may be applicable.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

8

What is claimed is:

1. A power storage comprising:

a stack made of stacked power storage cells; and a casing in which the stack is accommodated, wherein the casing includes an upper case and a lower case, with respect to a stacked direction of the stack, wherein the upper case and the lower case are fixed to each other, the upper case includes an upper wall portion and an upper peripheral wall portion that extends downward from around a periphery of the upper wall portion, so that the upper case has an open box shape, the upper wall portion includes a central portion located in a center in a plane direction orthogonal to the stacking direction and an outer peripheral portion located around the central portion so as to be between the central portion and the periphery of the upper wall portion, wherein the upper wall portion has a recessed shape such that the central portion is closer to the stack than the outer peripheral portion, the lower case includes a lower wall portion and a lower peripheral wall portion that extends upward from around a periphery of the lower wall portion, so that the lower case has an open box shape, the lower wall portion includes a central portion located in a center in a plane direction orthogonal to the stacking direction and an outer peripheral portion located around the central portion so as to be between the central portion and the periphery of the lower wall portion, wherein the lower wall portion has a recessed shape such that the central portion is closer to the stack than the outer peripheral portion, and the stack is sandwiched between the central portion of the upper wall portion and the central portion of the lower wall portion, and an outer surface of a tip end of the lower peripheral wall portion overlaps with an inner surface of a tip end of the upper peripheral wall portion, as viewed from a side view of the case, so that the outer surface of the tip end of the lower peripheral wall portion presses into the inner surface of the tip end of the upper peripheral wall portion and an upper surface of the tip end of the lower peripheral wall portion, which is further upward than the outer surface, is not in contact with the upper peripheral wall portion, and a lower portion of the upper peripheral wall portion is deformed outward from the tip end of the lower peripheral wall portion in a facing direction in which the tip end of the upper peripheral wall portion and the tip end of the lower peripheral wall portion face each other.

2. The power storage according to claim 1, wherein each of the power storage cells includes an electrode assembly, an exterior film with which the electrode assembly is sealed, an electrolyte solution accommodated inside of the exterior film, and a current collection plate connected to the electrode assembly and provided to protrude from the exterior film, and the power storage further comprises an insulating cover portion that covers a part of the current collection plate that protrudes from the exterior film.

3. The power storage according to claim 2, wherein
the cover portion includes an adhesive that bonds the
exterior film and the current collection plate with each
other and a filling member with which the casing is
partially filled, and
the filling member is provided to cover the adhesive and
the part of the current collection plate that protrudes
from the adhesive and the exterior film.

4. The power storage according to claim 2, wherein
the cover portion includes an adhesive that bonds the
exterior film and the current collection plate with each
other and a filling member partially filling the casing,
the filling member covers a part of the current collection
plate that protrudes from the adhesive and the exterior
film, and
the adhesive covers a part of the current collection plate
which the filling member is absent therefrom.

5. The power storage according to claim 2, further com-
prising:
a bus bar, wherein
the cover portion includes an adhesive that bonds the
exterior film and the current collection plate with each
other and a filling member with which the casing is
partially filled,
each current collection plate includes a positive electrode
current collection plate and a negative electrode current
collection plate,
the positive electrode current collection plate and the
negative electrode current collection plate are con-
nected to each other through the bus bar, and
the bus bar is covered by the filling member.

6. The power storage according to claim 2, wherein
the cover portion includes an adhesive that bonds the
exterior film and the current collection plate with each
other and a filling member partially filling the casing,
and
the adhesive covers all of the current collection plate
which is not covered by the filling member.

7. The power storage according to claim 2, wherein
the cover portion includes an adhesive that bonds the
exterior film and the current collection plate with each
other and a filling member partially filling the casing,
and
the filling member is in contact with a side walls of the
casing.

8. The power storage according to claim 2, wherein the
cover portion includes:
an adhesive that bonds the exterior film and the current
collection plate with each other, and
a filling member with which the casing is partially filled,
wherein the filling member is not in contact with the
exterior film.

9. The power storage according to claim 1, wherein
the upper peripheral wall portion includes
a portion having an outer surface that is substantially
flush with an outer surface of an upper portion of the
lower peripheral wall portion,
the tip end of the upper peripheral wall portion, and
a connecting portion that connects the portion and the
tip end of the upper peripheral wall portion,
the connecting portion expands outward in the facing
direction as the connecting portion extends downward.

10. The power storage according to claim 1, further
comprising a sealing member arranged between the tip end
of the lower peripheral wall portion and the upper peripheral
wall portion.

11. The power storage according to claim 1, wherein an
amount of recess of the central portion of the upper wall
portion as compared with the outer peripheral portion of the
upper wall portion in a state before the stack is sandwiched
between the upper wall portion and the lower wall portion is
smaller than an amount of recess in a state after the stack is
sandwiched between the upper wall portion and the lower
wall portion.

* * * * *